Figure 1:
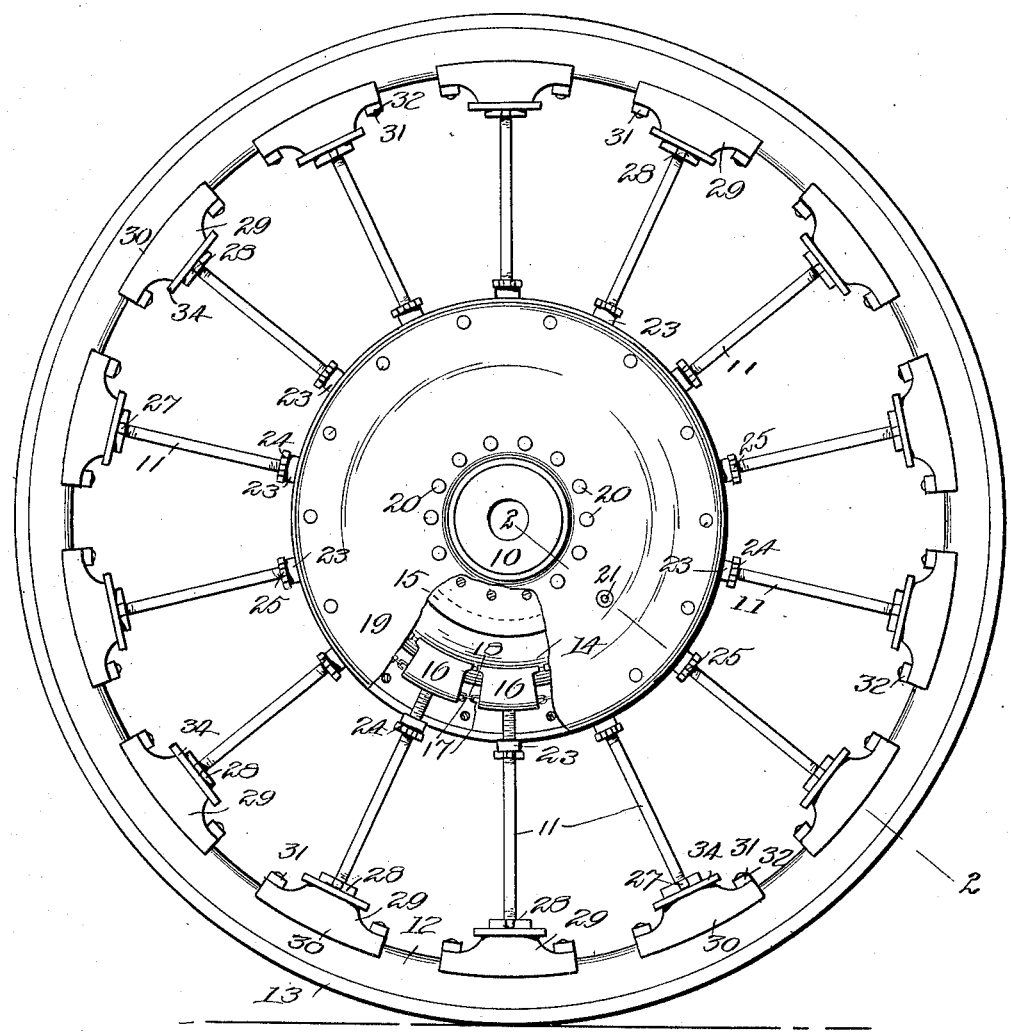

J. CALLAN.
VEHICLE WHEEL.
APPLICATION FILED DEC. 1, 1910.

1,004,988.

Patented Oct. 3, 1911.

2 SHEETS—SHEET 1.

J. CALLAN.
VEHICLE WHEEL.
APPLICATION FILED DEC. 1, 1910.
1,004,988.
Patented Oct. 3, 1911.
2 SHEETS—SHEET 2.
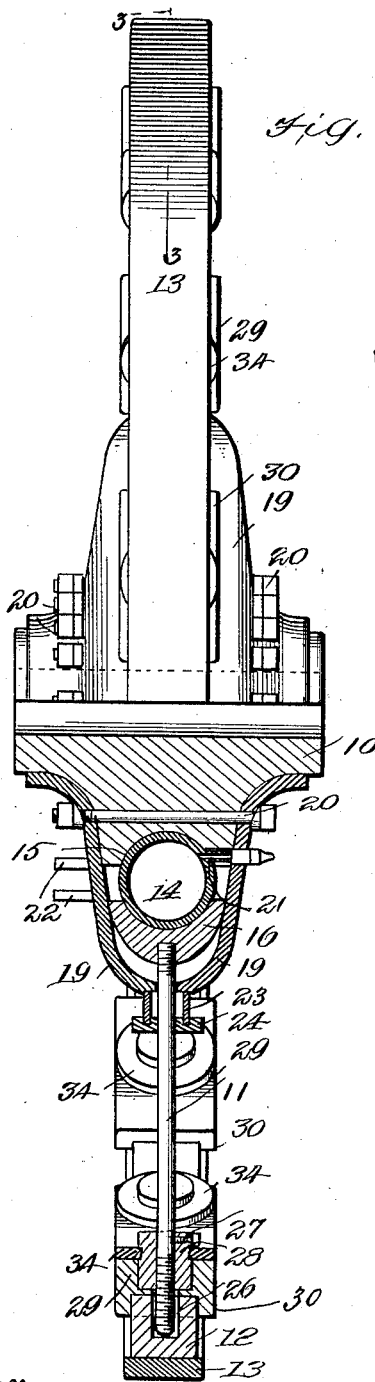
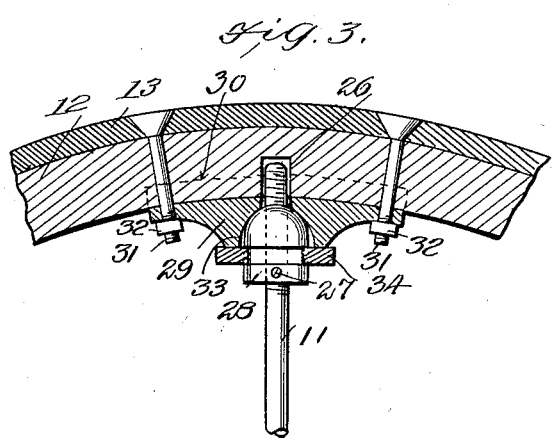
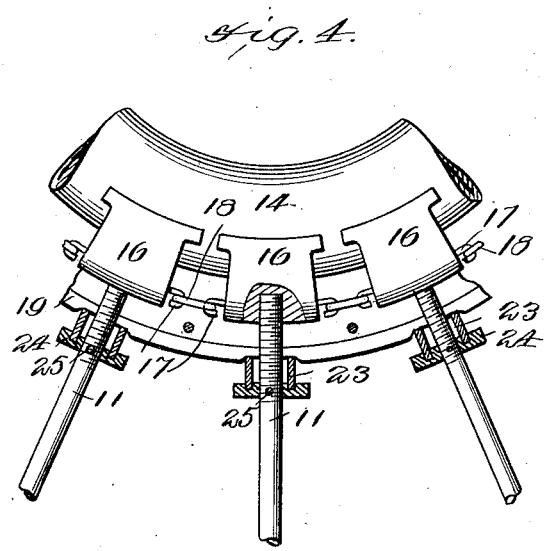
Witnesses
F. C. Barry
A. R. Walton
Inventor
John Callan
by Milo K. Stevens
Attorneys

UNITED STATES PATENT OFFICE.

JOHN CALLAN, OF GLOBE, ARIZONA TERRITORY.

VEHICLE-WHEEL.

1,004,988.  Specification of Letters Patent.  Patented Oct. 3, 1911.

Application filed December 1, 1910. Serial No. 595,087.

*To all whom it may concern:*

Be it known that I, JOHN CALLAN, citizen of the United States, residing at Globe, in the county of Gila and Territory of Arizona, have invented certain new and useful Improvements in Vehicle-Wheels, of which the following is a specification.

This invention relates to that class of vehicle wheels wherein the hub is provided with a pneumatic cushion which receives the impact of radially slidable spokes carrying the rim of the wheel, thus allowing the rim to yield to inequalities of the roadway, and dispensing with pneumatic or other cushion tires.

It is the object of the invention to provide a wheel of the kind stated which is simple in construction, and efficient in operation, and with these objects in view, the invention consists in a novel construction and arrangement of parts to be hereinafter described and claimed, reference being had to the accompanying drawings in which—

Figure 1 is an elevation, partly broken away, of the wheel constructed in accordance with the invention. Fig. 2 is an end view partly in section on the line 2—2 of Fig. 1. Fig. 3 is a sectional detail taken on the line 3—3 of Fig. 2. Fig. 4 is a sectional detail showing the manner of attachment of the inner end of the spokes.

Referring specifically to the drawings, 10 denotes the hub of the wheel, 11 are the spokes, and 12 is the rim, which latter may be provided with a metal or other tire 13. The hub is encircled by a cushion comprising an inflatable tube 14, the periphery of the hub having a groove 15 to form a seat for said tube. The inner ends of the spokes are made fast to shoes 16 by being screwed thereinto, said shoes engaging the tube 14. The side of the shoe which engages the tube is grooved, and also curved to conform to the curvature of the tube, so that it may fit snugly thereon. To the ends of the shoes are secured hooks 17, the hooks of adjacent shoes being connected by links 18 to prevent displacement of the shoes. The connection between the shoes is a loose one so that each shoe may yield inwardly with the tube 14, independent of the other shoes.

The hub 10, tube 14, and shoes 16 are inclosed in a housing 19 having openings through which the spokes 11 loosely extend to the shoes. This housing is shaped to fit the sides of the hub, and also to completely inclose the same as well as the shoes, and it is secured by bolts 20 passing through the hub. The tube has a suitable valve for inflating the same, and the stem 21 of said valve extends to the outside of the housing through an opening therein. To the outside of the housing are also secured studs 22 which are for the attachment of a hub brake mechanism, if the latter is to be used in connection with the wheel.

In order to exclude dust, dirt, etc., from the housing and the parts which it incloses, each spoke 11 carries a rubber gasket 23 which encircles the opening through which the spoke enters the housing. The gasket is held against the housing by a nut 24 which is locked to the spoke by a set screw 25, and that portion of the housing which is adjacent to the aforesaid opening has a depression surrounding said opening, in which depressions the gasket seats.

The outer ends of the spokes extend into recesses 26 made in the inner periphery of the rim 12, and to these ends of the spokes are secured, by means of set screws or other suitable means 27, heads 28. To the inner periphery of the rim, adjacent to each spoke, is secured a guard plate 29 having side flanges 30 which fit the sides of the rim. These guard plates are secured to the rim by means of bolts 31 passing through the same, and secured by nuts 32, the heads of the bolts being countersunk in the tire 13. These bolts therefore not only secure the plates 29, but also fasten the tire to the rim.

In the face of the guard plates 29 are sockets 33 in which the heads 28 seat. The sockets also open through the plate into the recesses 26, so that the ends of the spokes projecting from the heads may enter said recesses. The portion of the head which enters the socket is rounded off, and the sockets are correspondingly shaped, and as the spokes are loose in the recesses 26, it will be seen that they are free to rock slightly in the plane of rotation of the wheel, to accommodate the spokes to the various movements incident to the travel of the wheel when the latter is in motion.

In order to exclude dust, dirt, etc., from the sockets 33, the heads 28 carry gaskets 34 which fit over the outer ends of said sockets. The gaskets may be rubber rings which are frictionally held in place on the heads by being sprung into grooves in the latter.

In operation, the weight of the vehicle is transmitted through the hub 10, the tube 14, and shoes 16 to the spokes and rim, and as the wheel rotates, the rim yields inwardly, the thrust being taken up by the tube. The spokes are free to move radially or in the direction of their length when the rim yields inwardly as stated, thus pressing the shoes against the tube, so that any jars or shocks occasioned by the wheels passing over rough surfaces will be absorbed by the tube. The vehicle therefore travels smoothly, and it is possible to dispense with pneumatic or other cushion tires, all the advantages of such tires being obtained by the herein described structure.

I claim:

1. A wheel comprising a hub, a cushion encircling the hub, a rim having recesses in its inner periphery, plates fastened to the rim over said recesses, said plates having sockets which open into the recesses, spokes, heads carried by the spokes adjacent to their outer ends, said heads seating in the sockets of the aforesaid plates, and the ends of the spokes extending through said sockets into the recesses of the rim, and shoes carried by the inner ends of the spokes, said shoes engaging the aforesaid cushion.

2. A wheel comprising a hub, a cushion encircling the hub, a rim, socketed plates secured to the inner periphery of the rim, spokes, heads carried by the outer ends of the spokes and seating in the sockets of the aforesaid plates, gaskets carried by the heads, said gaskets fitting over the outer ends of the sockets, and shoes carried by the inner ends of the spokes, said shoes engaging the aforesaid cushion.

In testimony whereof I affix my signature in presence of two witnesses.

JOHN CALLAN.

Witnesses:
JOHN F. HECHTMAN,
WILLIAM A. COMER.

---

Copies of this patent may be obtained for five cents each, by addressing the "Commissioner of Patents, Washington, D. C."